Sept. 28, 1937.　　　　F. C. FRANK　　　　2,094,065
BRAKE
Filed March 16, 1932

INVENTOR.
FREDERICK C. FRANK
BY
ATTORNEY

Patented Sept. 28, 1937

2,094,065

UNITED STATES PATENT OFFICE 2,094,065

BRAKE

Frederick C. Frank, South Bend, Ind., assignor to Bendix Aviation Corporation, South Bend, Ind., a corporation of Delaware Application March 16, 1932, Serial No. 599,264

12 Claims. (Cl. 188—18)

This invention relates to brakes and more particularly to disc brakes.

Broadly, the invention comprehends a disc brake adaptable for wheels equipped with low pressure tires. In wheels of this particular type, the over-all diameter of the wheel is relatively small; hence, the associated brake structure is of necessity correspondingly small. It is, therefore, highly desirable that the component parts of the brake be designed to perform multi-functions. It is also desirable that the various parts of the brake be so designed they may be assembled in a compact unit, which may be easily and quickly installed.

An object of the invention is to provide a brake structure in which the various parts in the assembly perform multi-functions, so that the number of parts may be greatly reduced.

Another object of the invention is to provide a brake assembly including a compact unit which may be easily and quickly installed.

Another object of the invention is to provide a hydraulically operated brake comprising a relatively few parts which may be easily and quickly assembled and will effectively perform its intended function.

A further object of the invention is to provide a brake structure in which the number of parts have been reduced to a minimum, and in which the machine operation on the various parts has been greatly reduced, to the end that the brake may be manufactured at an exceedingly low cost.

A feature of the invention is a sleeve which may be slipped on an axle and keyed thereto to provide a shoulder for a wheel, and in addition thereto a suitable braking flange.

Another feature of the invention is an axially movable annular housing having an annular chamber or cylinder and a sleeve or piston movable therein having an annular friction member.

Other objects and features will appear from the following description taken in connection with the drawing, which forms a part of the specification, and in which.

Figure 1:
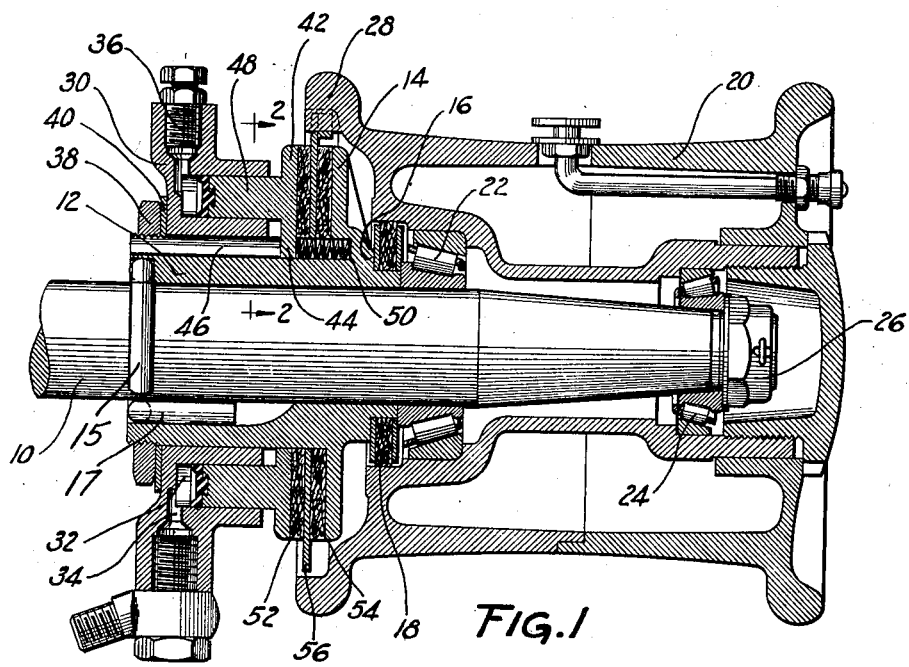
Figure 1 is a vertical sectional view through a wheel and its associated brake.
Figure 2:
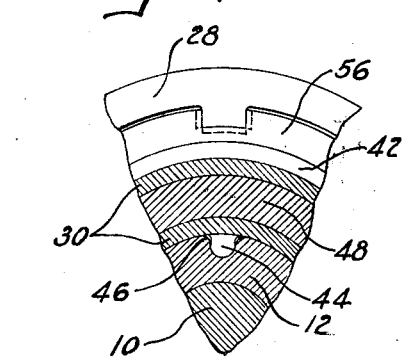
Figure 2 is a section substantially on line 2—2, Figure 1.

Referring to the drawing for more specific details of the invention, 10 represents an axle which may be of any preferred type. The axle has positioned thereon a sleeve 12, provided with a circumferential flange 14, and a shoulder 16 for the reception of a grease washer 18. The sleeve 12 is keyed to the axle against rotatable and axial movements by the key 17 extending from a ring 15 securely fastened to the axle shaft 10.

The axle has positioned for rotation thereon a wheel 20 supported on suitable bearings. As shown, the wheel is provided with bearings 22 and 24, the bearing 22 engaging the sleeve 12, and the bearing 24 engaging a retaining nut 26 threaded on the end of the axle. The wheel 20 has a flange 28 which completely houses the circumferential flange 14 on the sleeve 12, the object of which will hereinafter appear.

Positioned for axial movement on the sleeve 12 is an annular housing 30 provided with an annular chamber 32, having an intake port 34 and a vent 36. The housing 30 is retained on the sleeve 12 by a nut 38 threaded on the sleeve with a suitable washer 40 interposed. Axially movable upon the sleeve 12 is an annular member or ring 42 having lugs 44 engaging grooves or slots 46 in the sleeve to prevent relative rotation between the sleeve and the annular member.

The annular member 42 which may have a T cross section, the stem of which cross section may form a sleeve or annular piston 48 is positioned for reciprocation in the annular chamber 32. The piston 48 carries an annular cup shaped resilient head which provides a leak-proof fitting between the piston and the chamber.

Positioned in the slots or grooves 46 between the circumferential flange 14 and the lugs 44 on the annular member 42 are compression springs 50 adapted to return the annular member 42 to its normal position. The annular member 42 is provided with a suitable liner 52, and the circumferential flange 14 is provided with a corresponding liner 54.

Positioned between the liners 52 and 54 is a floating frictional disc 56 supported by the flange 28 on the wheel. The friction disc 56 has an interlocking connection with the flange 28 on the wheel which provides for the removal of the wheel without the removal of the disc, so that the wheel may be removed from the axle without in any way disturbing the brake assembly.

Figure 3:
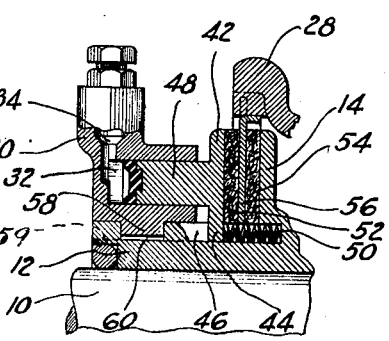
Figure 3 is a fragmentary view illustrating a modified form of a locking means between the fixed and movable elements of the brake.
Figure 4:
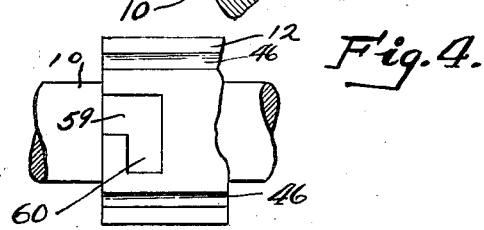
Figure 4 is a fragmentary view of the modified form of Fig. 3 illustrating the axle and sleeve with the brake parts removed.

A modification of the invention is illustrated in Figure 3. In this modification the annular housing 30 is provided with inwardly extending substantially square lugs 58, adapted to slide freely in the axial extending grooves or slots 59 in the sleeve and to engage suitable circumferentially extending notches 60 communicating with the slots upon rotation, to effectively lock the housing on the sleeve 12, the slots 59 and notches 60 forming grooves of L-shape as shown in Fig. 4 to receive lugs 58 upon axial and rotational movement of the cylinder member.

An important factor of this invention is to be found in the sleeve 12 having formed integral therewith a circumferential flange providing the fixed element of the brake. This sleeve not only functions as one of the essential elements of the brake, but also functions as a shoulder for one of the bearings supporting the wheel, and as a shoulder for a grease retaining washer.

Another important factor is the particular arrangement of the hydraulically operating means including an annular housing adjustably positioned on the sleeve, the arrangement of the annular chamber therein and the annular sleeve or piston cooperating with the chamber.

In operation fluid under pressure is delivered through the intake port 34 to the annular chamber 32 to create pressure upon the head of the sleeve or piston 48 to move the annular member 42 co-axially upon the sleeve 12 to effectively clamp the friction disc 56 between the annular member and the circumferential flange 14, carried by the sleeve 12. Upon release of pressure on the fluid in the annular chamber 32, the springs 50 serve to return the brake to the off position.

Although this invention has been described in connection with certain specific embodiments, the principles involved are suscept'ble of numerous other applications that will readily occur to persons skilled in the art. The invention is, therefore, to be limited only as indicated by the scope of the appended claims.

Having thus described the various features of the invention what I claim as new and desire to secure by Letters Patent, is:

1. A brake comprising a sleeve, an annular housing, an annular chamber in the housing, an annular piston having a T section, the stem of which extends within the chamber and the top of which is splined along one edge on said sleeve and inlet and outlet ports communicating with the chamber.

2. A brake comprising a sleeve, an annular housing thereon, an annular cylinder arranged therein, inlet and outlet ports communicating with the cylinder, an annular member splined on said sleeve, and an annular piston carried thereby and movable in the annular cylinder, said member and piston having a T cross sectional shape, the piston forming the stem thereof.

3. A brake comprising a sleeve having parallel slots and a flange, an annular housing movable axially on the sleeve, an annular member having lugs engaging the slots in the sleeve, an annular piston on the annular member adaptable for reciprocation in the chamber, and a rotatable and axially movable member positioned between the flange and the annular member.

4. A brake comprising a sleeve having slots parallel to the axis thereof and a flange, a shoulder on the sleeve adjacent the flange, an annular housing positioned for axial movement on the sleeve, means carried by the sleeve for adjusting the annular housing, an annular chamber in the housing, ports communicating with the chamber, an annular member slidable on the sleeve having lugs engaging the slots on the sleeve, an annular piston on the annular member, positioned for reciprocation in the chamber, and a rotatable axially movable member positioned between the flange and the annular member.

5. A brake structure comprising a sleeve having slots arranged therein parallel to the axis thereof, a flange on the sleeve, a shoulder on the sleeve, a grease retaining washer on the shoulder, an annular housing movable on the sleeve, means for adjusting the housing, an annular chamber in the housing, ports communicating therewith, an annular member having lugs engaging the slots, an annular piston on the annular member adaptable for reciprocation in the chamber, and a rotatable, axially movable member positioned between the flange on the sleeve and the annular member.

6. A brake structure comprising a sleeve having slots arranged therein parallel to its axis, a flange on the sleeve, a shoulder adjacent the flange, a grease retaining washer on the shoulder, a housing adjustable on the sleeve, an annular chamber in the housing, ports communicating with the chamber, an annular member on the sleeve having lugs engaging the slots, an annular piston on the annular member adaptable for reciprocation in the chamber, return springs positioned in the slots abutting the lugs carried by the annular member, and a rotatable axially movable friction element positioned between the flange on the sleeve and the annular member.

7. A disc brake comprising a stationary sleeve having longitudinal grooves therein and a disc member secured thereto, a slidable disc member splined in said grooves, a rotatable wheel, having a cup-shaped flange at one end, longitudinal splines on the inside of said flange, a rotatable disc member between said first named disc member and the slidable disc member slidably but rotatably carried in said splines, an annular cylinder arranged on said sleeve and radially outwardly spaced from said splines, and an annular piston in said cylinder, said piston and first named slidable disc member forming in section a T, said piston forming the stem thereof.

8. A disc brake comprising a sleeve having a disc member secured thereto, a slidable disc member splined on said sleeve and slidable towards and away from said secured disc member, an annular cylinder on said sleeve having inner and outer cylindrical surfaces, the inner surface being of greater diameter than the splined portion of said sleeve, and an annular piston in said cylinder adapted to actuate said slidable disc member, said piston and slidable member together having a cross section of T-shape, the piston forming the stem thereof.

9. A brake comprising a sleeve having parallel slots, an annular flange, an annular housing member having a chamber on the sleeve, means for adjusting one of said members axially upon said sleeve and securing the member in adjusted position, an annular member having lugs engaging the slots in the sleeve, an annular piston adapted for axial reciprocation in said chamber for axially moving said annular member having lugs, and a rotatable and axially movable member positioned between the flange and the annular member.

10. A brake comprising a sleeve having slots parallel to the axis thereof, a flange thereon, a shoulder on the sleeve adjacent the flange, an annular housing positioned on the sleeve, means carried by the sleeve for axially adjusting the flange relative to the housing, an annular chamber in the housing, ports communicating with the chamber, an annular member slidable on the sleeve having lugs engaging the slots on the sleeve, an annular piston on the annular member, positioned for reciprocation in the chamber, and a rotatable axially movable member positioned between the flange and the annular member.

11. A brake structure comprising a sleeve having slots arranged therein parallel to its axis, a flange on the sleeve, a shoulder adjacent the flange, a grease retaining washer on the shoulder, a housing adjustable on the sleeve, an annular chamber in the housing, ports communicating with the chamber, an annular member on the sleeve having lugs engaging the slots, an annular piston on the annular member adaptable for reciprocation in the chamber, and a rotatable axially movable friction element positioned between the flange on the sleeve and the annular member.

12. A vehicle wheel comprising, in combination, an axle, a hub, a tire retaining flange mounted on said hub, a tire mounted directly on said hub and abutting said flange, a radial braking surface secured to said flange and against rotation relative to said hub, means coacting with said radial braking surface to apply the brake comprising a cylindrical sleeve concentric with said hub, and means comprising a threaded portion on the outside of the sleeve and an associated threaded part for adjusting the clearance of the braking surface by axial movement of the part.

FREDERICK C. FRANK.